Feb. 6, 1962 D. P. KURTZ 3,020,491
STARTING CIRCUIT FOR TRANSISTOR POWER SUPPLY
Filed March 4, 1959
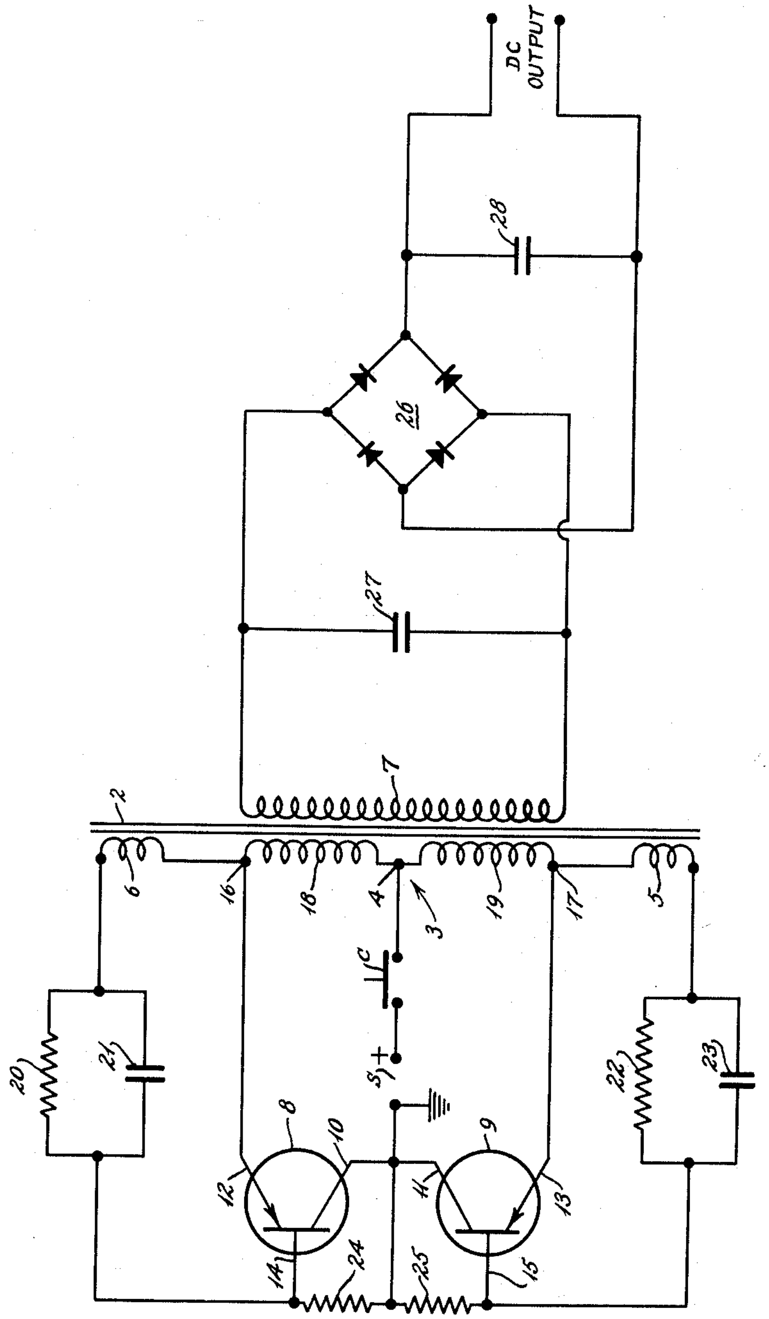
INVENTOR.
Donald P. Kurtz
BY
Mead, Brown, Schuyler & Beveridge
ATTORNEYS United States Patent Office 3,020,491

Patented Feb. 6, 1962

3,020,491

STARTING CIRCUIT FOR TRANSISTOR POWER SUPPLY

Donald P. Kurtz, Rockaway, N.J., assignor to Aircraft Radio Corporation, Boonton, N.J., a corporation of New Jersey Filed Mar. 4, 1959, Ser. No. 797,272

6 Claims. (Cl. 331—113)

This invention relates to a transistor power supply and particularly concerns an alternating current generator having a pair of transistors in a push-pull oscillator circuit for converting low voltage direct current into alternating current which may be rectified to provide a high voltage direct current supply.

An object of this invention is to provide a transistor oscillator circuit with improved starting and operating characteristics.

In the attainment of these objects an important feature of the invention resides in the arrangement of a pair of transistors in a push-pull oscillator circuit including a saturable core reactor and a source of direct current potential with feedback circuits between windings of the reactor and electrodes of the transistors to render the transistors alternately conductive. Connected in series with these feedback circuits and the potential source are voltage dividers having intermediate points connected to electrodes of the transistors for applying starting potentials to render at least one of the transistors conductive.

Particularly, the transistors are connected with grounded collectors and feedback windings connected through relatively small resistors to the respective bases of the transistors for applying switching voltages to the base electrodes. Relatively large resistors are connected between the respective bases and the grounded collectors to apply direct current potentials to the electrodes of the transistors. Preferably the small resistors in the feedback circuits are shunted by capacitors providing a low impedance path to potential impulses from the feedback windings of the reactors.

A power supply embodying the invention in its preferred form is illustrated in the drawing wherein a saturable core reactor 2 has a primary winding 3 with a center tap 4 connected through switch C to D.C. potential source S and arranged in a push-pull circuit with transistors 8 and 9. Collector 10 of transistor 8 and collector 11 of transistor 9 are connected to ground while emitter 12 of transistor 8 and emitter 13 of transistor 9 are respectively connected to opposite ends 16 and 17 of the primary winding 3. Inasmuch as transistors 8 and 9 are of the PNP type, positive side D.C. potential source S is connected to emitter 12 of transistor 8 through the center tap 4 and the upper half 18 of the primary winding 3. This D.C. potential is applied to the emitter 13 of transistor 9 through the center tap 4 and the lower half 19 of primary winding 3.

Conventionally, in push-pull oscillators of this type the core of the reactor is switched alternately from one saturation state to another saturation state by the alternate conduction and non-conduction of the two transistors 8 and 9. In the preferred embodiment, the saturable reactor is provided with a pair of feedback windings 5 and 6, one for each transistor, for alternately applying a switching voltage to the base of each transistor. To accomplish this, a small resistor 20 paralleled by a capacitor 21 is connected between feedback winding 6 and base 14 of transistor 8. Similarly, small resistor 22 and capacitor 23 form an R.C. network between feedback winding 5 and base 15 of transistor 9.

In order to apply potentials to the transistors so at least one will be conductive when the circuit is to be operated, as upon closing of switch C, a relatively large resistor 24 is connected between the base 14 and the grounded collector 10 of transistor 8 and a similar relatively large resistor 25 is connected between the base 15 and grounded collector 11 of transistor 9.

Small resistor 20 and large resistor 24 form a voltage divider for transistor 8 connected across the source of D.C. potential through the low resistance of the primary winding 18 and the feedback winding 6 with base 14 connected to a point on the voltage divider to bias transistor 8 to a normally conductive state. Likewise, small resistor 22 and large resistor 25 form a voltage divider for applying a potential to base 15 so transistor 9 will normally be conductive. If transistors 8 and 9 had identical characteristics, both would become conductive. However, due to the fact that even similar transistors have slightly different characteristics, there is enough unbalance in the circuit to cause one transistor to begin to conduct before the other. Normally, the transistor with the greater gain will begin conducting first before the transistor with the lower gain. Assuming that transistor 8 has a greater gain than transistor 9, transistor 8 will be the first to conduct and transistor 9 will be cut off when transistor 8 is conducting. Current flow in primary winding 18 generates a voltage in feedback winding 5 which opposes the normal bias of base 15. At the same time a regenerative feedback voltage developed in feedback winding 6 is added to the normal voltage across the voltage divider of resistors 20 and 24 and applied to the base 14 of transistor 8. Upon saturation of the core the feedback voltage in winding 6 drops so the current through transistor 8 is reduced. As a result, there is a decay of the flux in the reactor which produces an opposite voltage in feedback winding 6 sufficient to oppose the normal bias on base 14 and thereby cut off transistor 8. Then, further decay of the flux in reactor 2 develops a feedback voltage of proper polarity across the voltage divider comprising resistors 21 and 25 to base 15 so transistor 9 becomes conductive. Regenerative action results in an increase in the current through transistor 9 and the lower half 19 of primary winding 3 until the core of the reactor saturates, at which time the cycle repeats.

Thus, the transistors reverse the current in primary winding 3 of saturable reactor 2 to produce an A.C. voltage in secondary winding 7 of a magnitude established by the ratio of the primary and secondary windings. This voltage in the secondary winding is rectified by full wave rectifier 26 and filtered by large capacitor 28 across the output.

A capacitor 27 connected across the secondary winding 7 augments the effect of capacitors 21 and 23 to speed the transition time of each transistor between a conductive and non-conductive state.

The invention disclosed herein is illustrated in a grounded collector circuit. However, the invention, with minor circuit modifications, may be employed with other transistor connections.

The foregoing specification is intended to illustrate a preferred form of the invention which may be employed in similar circuits without departing from the invention as defined by the following claims.

In the claims:

1. An alternating current generator comprising a pair of transistors connected in a push-pull oscillator circuit with a saturable core reactor, a source of D.C. potential connected through said saturable core reactor to two electrodes of each of said transistors, feedback circuits including said saturable core reactor for applying switching voltages to a third electrode of each of said transistors to cause said transistors to conduct alternately including a pair of voltage dividers respectively connected in series with said reactor and said source of D.C. potential with intermediate points of said voltage dividers respectively connected to said third electrode of said transistors for supplying a starting current to said transistors.

2. An alternating current generator comprising a pair of transistors having grounded collectors and connected in a push-pull oscillator circuit with a saturable core reactor having primary, secondary and feedback windings, a source of D.C. potential connected in the emitter-collector circuit of each of said transistors, and separate voltage dividers for each transistor connected between said feedback windings and ground with the bases of said transistors connected to intermediate points on the respective voltage dividers for applying switching voltages to the bases of each of said transistors to cause said transistors to alternately shift between a state of conduction and a state of non-conduction.

3. An alternating current generator comprising a pair of transistors having grounded collectors and connected in a push-pull oscillator circuit with a saturable core reactor having primary, secondary and feedback windings, a source of D.C. potential connected in the emitter-collector circuit of each of said transistors, relatively large resistors connected between the bases and collectors of said transistors for supplying a starting current thereto, and feedback circuits including relatively small resistors connecting said feedback windings to the bases of said transistors for applying switching voltages to said bases to cause said transistors to alternately shift between a state of conduction and a state of non-conduction.

4. An alternating current generator as defined in claim 3 wherein said feedback circuits include capacitors connected in parallel with said relatively small transistors.

5. An alternating current generator comprising a pair of transistors having grounded collectors connected in a push-pull oscillator circuit with a source of D.C. potential and a saturable core reactor having primary, secondary and feedback windings, said primary windings and said source being connected in series in the emitter-collector circuits of the respective transistors, and voltage dividers connected in series with said source and said feedback windings with the bases of the respective transistors connected to intermediate points of said voltage dividers for applying starting currents to render one of said transistors initially conductive and switching voltages to cause said transistors to conduct alternately.

6. An alternating current generator as defined in claim 5 wherein a major portion of the resistance of each of said voltage dividers is connected between the collectors and bases of the respective transistors.

References Cited in the file of this patent

UNITED STATES PATENTS

| | | |
|---|---|---|
| 2,837,651 | Schultz | June 3, 1958 |
| 2,852,730 | Magnuski | Sept. 16, 1958 |
| 2,874,293 | McMurren | Feb. 17, 1959 |
| 2,927,281 | Vogt et al. | Mar. 1, 1960 |
| 2,946,022 | Davis | July 19, 1960 |
| 2,948,841 | Locanthi et al. | Aug. 9, 1960 |

FOREIGN PATENTS

| | | |
|---|---|---|
| 216,490 | Australia | Aug. 8, 1958 |